United States Patent [19]

Mirecki

[11] 4,018,003
[45] Apr. 19, 1977

[54] HOT CAP

[76] Inventor: Walter Mirecki, c/o Anthony J. Pieragostini, Esq., 61 Smith Ave., Mount Kisco, N.Y. 10549

[22] Filed: Apr. 14, 1976

[21] Appl. No.: 677,014

[52] U.S. Cl. .................................... 47/26; 47/84
[51] Int. Cl.[2] ................................. A01G 13/00
[58] Field of Search .................. 47/19, 26–30, 47/34.11, 1, 37

[56] References Cited

UNITED STATES PATENTS

| 404,585 | 6/1889 | Wright | 47/37 |
|---|---|---|---|
| 1,747,967 | 2/1930 | Bell | 47/28 |
| 2,062,410 | 12/1936 | Garcia | 47/30 |
| 2,260,436 | 10/1941 | Chambers | 47/28 |
| 3,384,992 | 5/1968 | Heffron | 47/29 |

FOREIGN PATENTS OR APPLICATIONS

| 257,318 | 10/1948 | Switzerland | 47/28 |

Primary Examiner—Robert E. Bagwill
Attorney, Agent, or Firm—Robert D. Farkas

[57] ABSTRACT

This disclosure pertains to a hot cap fabricated from two precut sheets of semi-rigid plastic or paper stock material. Each sheet resembles an isosceles triangle with the apex portion removed along a line parallel to the base of the triangle. Two flaps are formed along a horizontal fold line at the narrow end of the triangle, separated by a central knotch having a vertical axis. A series of holes are placed parallel and close to the base line. The four flaps are folded together in locking position in similar fashion to a conventional cardboard container and have ventilation holes passing through the flaps in each corner of the horizontal surface formed thereby. The holes adjacent the base line are utilized for securing purposes and ventilation, if so desired, when the lowermost edges are formed into generally circular shape and are depressed into the earth. The flaps are readily opened or closed providing a variable degree of access for ventilation and watering purposes.

8 Claims, 5 Drawing Figures

HOT CAP

BACKGROUND OF THE INVENTION

1. The Field of the Invention

This invention relates to that class of devices designed to provide protection against the elements for seedlings, small plants, and seeds. Access is required for ventilation and watering through orifices in the surface of the enclosure.

2. Description of the Prior Art

The prior art deals in the main with preassembled structures nested together for shipment constructed primarily out of paper-like materials. Some concepts include wire frames over which plastic sheets are draped with provisions for ventilation.

SUMMARY OF THE INVENTION

The instant invention is an inexpensive flat pre-fabricated truncated cone which is opened into a hollow plant enclosure having a wide circular base which is inserted into the earth or fastened to a circular base section when utilized as a shipping container. The uppermost portion terminates in a narrow flat horizontal surface parallel to the base. The upper surface consists of four flaps which can be folded together in interlocking relationship similar to the interlocking method employed in a conventional cardboard container closure as accomplished without staples or tape. Two holes in each of the four flaps result in four holes in the flaps when they are interlocked, providing ventilation to the plant within the enclosure. The flaps, after the lower circular edge of the hot cap is inserted in the earth, may be opened to provide increased sunlight and air circulation as well as a convenient means to water the plant. A series of holes piercing the surface and adjacent the lowermost circular edge are employed to secure the hot cap to the earth and can be used selectively to increase the amount of air permitted to circulate in the enclosure. The hot cap may be removed after use, cleaned, and restored to its flat position by simply unfolding the flaps so that it may be reused. A circular base can be fastened to the inner surface of the hot cap after a prebundled or potted seedling or plant is inserted into the enclosure. Staples or other fastening devices may be used to either pierce the surface of the hot cap or to pass through the holes formed adjacent the lowermost edges of the hot cap. The hot cap can obviously be employed to protect potted plants or seedlings which may be kept outdoors in a protected condition without requiring unpotting or repotting.

A primary object of the instant invention is to provide an inexpensive prefabricated effective plant enclosure.

Another object is to provide a plant enclosure which can be simply placed into the ground in secure engagement thereto.

Still another object is to provide a hot cup which has a generally pointed uppermost surface preventing the accumulation of snow or rain.

A further object is to provide a hot cap which may be shipped and stored in a flat position eliminating nesting problems and bulk increased shipping costs.

Another object is to provide a structural design for a hot cap which facilitates the use of a wide variety of materials accommodating various conditions of climate and thereby varied functional methods of protecting the plants within.

Still another object is to provide a hot cap which may be easily assembled in the field.

A further object is to provide a method where varied amounts of air may be circulated through the enclosure upon simple manipulation of its elements and the earth adjacent the surface of the hot cap.

Another object is to provide a hot cap which can be utilized in conjunction with a circular base as a shipping or storage container for plants, seedlings, and the like.

These objects, as well as other objects of this invention, will become readily apparent after reading the following description of the accompanying drawings.

DESCRIPTION OF THE PREFERRED EMBODIMENT

Figure 1:
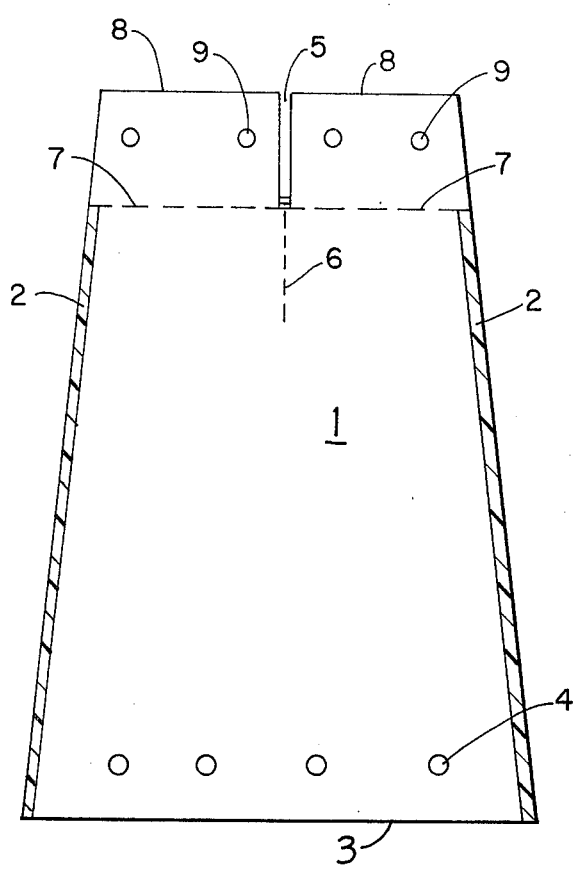
FIG. 1 is a front elevation view of a hot cap in its flat shipping position.

The structure and method of fabrication of the present invention is applicable to a hot cap which is inexpensively fabricated from two precut sheets of semirigid transparent or translucent plastic material or waterproof paper stock, fastened together by heatsealing or selective gluing them in one plane. Both sheets are identical to the other and during the heat sealing or gluing process, the two sheets are laid up congruent to each other. Each plastic or paper product precut blank generally resembles a truncated cone having a series of holes along a line parallel and close to the wider base thereof. The edge at the narrower top of each precut blank has a central knotch extending downwards along the center line which terminates in a vertical crease line or weakened portion. The vertical crease line does not extend fully to the wider edge at the base. Both side edges are sealed or glued extending from the base upwards to a horizontal crease line extending across the full width of the precut blank. This horizontal line is parallel to the wider base edge and passes through the bottom edge of the knotch. The knotch in each sheet in combination with the horizontal crease line create two foldable flaps for each blank. The unit can be shipped or stored in an unopened flat position.

In use, three of the four flaps are folded inwardly downwardly proceeding successively in either circular direction. The fourth flap is folded inwardly downwardly such that its corner adjacent the nearest corner of the first flap is tucked further downwardly to lie underneath the adjacent portion of the first flap. The knotch width is such that, when viewed from above, a square hole is produced in the center of the folded flaps. The folded flaps create, generally, a flat surface whose boundaries form a square. This uppermost surface lies in a plane formed by the lowermost base edges. The lowermost edges are then forced into a generally circular shape, facilitated by the partial vertical crease line now appearing at opposite corners of the square formed by the flaps. The other pair of opposite corners meet the flange edges where the two side edges are fastened together.

Approximately one half of each flap covers and is parallel to approximately one half of its adjacent flap. A hole passes through both adjacent halves of the flaps lying parallel to each other. This breathing hole is formed by one hole in each of the half flaps that form a corner of the square surface.

The assembly is inserted into the ground by applying a generally downward force uniformly across the uppermost square surface. Earth is kicked or troweled up along the lowermost portion of the outermost surface of the hot cap. The series of holes nearest the lowermost circular edge of the assembly are positioned to lie below the surface of the earth confined within the hot caps. Upon the first watering, moist earth having a lowered viscosity, tends to flow through the securing holes, communicating the earth confined within the hot cap to the earth surrounding it.

Should ventilation or ready access for watering purposes be desired, the four flaps may now be unfolded upwardly and outwardly to any desired degree forming an opening of selective size at the apex of the hot cap. If cross ventilation is desired, earth on both sides of one or more securing holes may be removed or compressed sufficiently to expose the hole, permitting the free passage of air therethrough.

AN ALTERNATIVE EMBODIMENT

The hot cap previously described may be utilized as a shipping or storage container compatable with indoor or outdoor service by adapting the assembled unfolded structure to a circular base. The rim of the circular base may be fastened to the inside surface of the hot cap at or near the lowermost base edges. A potted plant can be securely contained by elevating the base section until the circular rim of the pot symmetrically engages the side walls of the hot cap, followed by securing the base to the walls of the hot cap assembly. Additionally, seedlings or plants may be shipped in preballed fashion by fastening the earth ball to a wooden base by utilizing straps or wire ties passing in the wooden base.

Now referring to the Figures, and more particularly to the embodiment illustrated in FIG. 1 showing the prefabricated hot cap 1 in front elevation view which is composed of two flat precut sheets in juxtaposed position. Edges 2 may be heat sealed if a plastic material is employed or glued when a paper or cardboard-like material is utilized. Polyethylene, polypropylene, polyamides, and polyvinyl chloride semi-rigid or rigid plastic sheets may be employed possessing either transparent, translucent, or opaque light transmitting characteristics dependent upon the service in which the hot cap is to be employed. Inexpensive enclosures can be fabricated from a plastic material which has poor ultraviolet degradation characteristics if the use of the enclosure is limited to one growing season or for shipping purposes only. Paper or cardboard-like materials such as pitch impregenated paper similar to thick building paper may be employed for those plants which require protection during those periods that the plant is dormant or when it is desired to utilize the hot cap as a shipping container. The lower edges 3 of the juxtaposed sheets are not sealed together and have a series of holes 4 parallel thereto through each sheet. Knotch 5 is cut into each sheet having a square termination. Crease line 6 extends vertically and centrally downwards to a length dependent upon the size of the precut blanks and the slope of the heat sealed or glued edges 2. Crease line 7 permits the plastic or paper-like material to fold easily without fear of weakening the material to the point where tearing may occur along the line. Two flaps 8 are separated by knotch 5 in each precut blank. The flaps are permitted to fold inwardly or outwardly with complete freedom at crease line 7 which represents the uppermost termination of the heat sealed or glued lines. Holes 9 are pierced through each of the four flaps.

Figure 2:
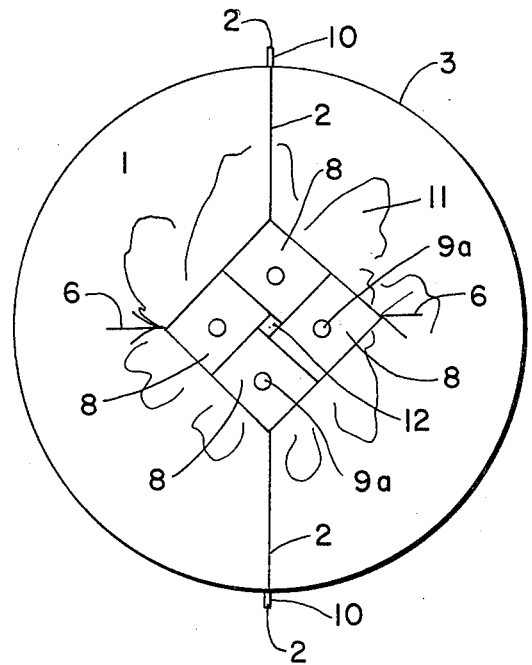
FIG. 2 is a plan view of an assembled opened hot cap enclosing a plant.

FIG. 2 illustrates the hot cap in the assembled open position as viewed from above. Flaps 8 are interlocked by a sequential folding method where the last free flap has one of its ends tucked under the adjacent free end of the first flap to be used in the interlocking procedure. Holes 9a are formed by a hole 9, as shown in FIG. 1, in each corner of the overlayed adjacent flaps. The layout of holes 9 as illustrated in FIG. 1 is such that they correspond in location when the flaps 8 are folded resulting in holes 9a. Heat sealed or glued edges 2 run down the surface of the cap to the generally circular edge 3 at the base. Tabs 10 are flanges created by the width of the heat sealed or glued portions 2 as depicted in FIG. 1. A plant 11 is illustrated within the hot cap and may be viewed if a transparent plastic material is employed. A square opening 12 is formed at the edges of the interlocked flaps providing additional ventilation means. This square opening may be eliminated or of variable size dependent on the size of the flaps. Crease line 6 facilitates the transition from a sharp corner at the uppermost horizontal plane to the conical surface of the hot cap which is created when edge 3 is formed into a circle.

Figure 3:
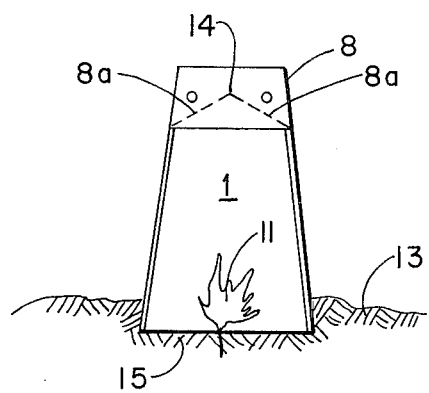
FIG. 3 is a side elevation view of the hot cap with its flaps open.

FIG. 3 illustrates the hot cap 1 mounted into earth 13 exterior to the hot cap when the hot cap is utilized in outdoor service. Two flaps 8 are illustrated opened into a near vertical position and are maintained by the side edges of flaps 8a which are bent generally inwards providing a rectangular opening 14 whose width may be varied by the simple process of bending flaps 8a upwardly and outwardly. The plant 11 is rooted in the earth 15 confined within the hot cap.

Figure 4:
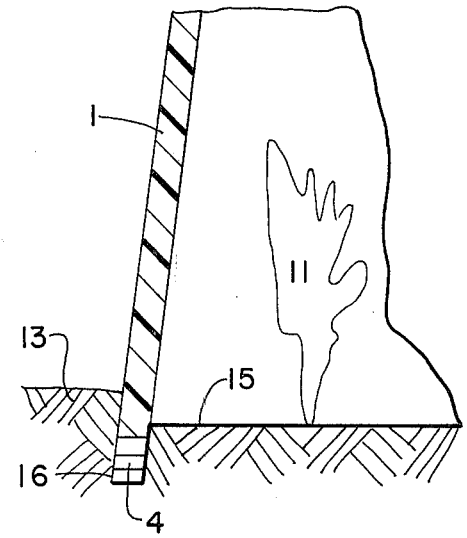
FIG. 4 is a fragmentary side elevation view of the hot cap engaged in the earth.

FIG. 4 illustrates the hot cap 1 engaging the earth 13 in touching engagement with its outermost surface. The interior earth portion 15 is illustrated at a lower grade level than earth 13 exterior to the hot cap's outermost surface. Holes 4 permit moist earth to pass through the walls of the hot cap insuring secure engagement of the assembly into the earth. If further ventilation is required, some areas of the earth 13 surrounding the hot cap and adjacent areas of earth 15 within the hot cap may be depressed or removed below the lowermost edge 16 of the selected holes 4. Plant 11 will be provided thereby with circulating air through the exposed holes 4 to the openings in the uppermost surfaces of the hot cap.

Figure 5:
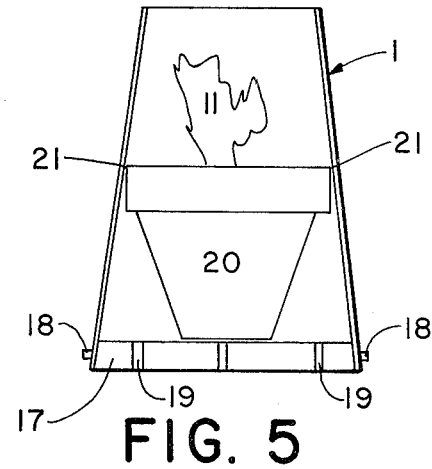
FIG. 5 is a front elevation view of the hot cap and a base enclosing a potted plant.

FIG. 5 illustrates the hot cap 1 when it is to be utilized as a shipping or storage container for either indoor or outdoor service when a circular base section 17 is fastened to the interior walls at or near the base by nails or rivets 18. Holes 19 provide drainage and may be utilized in securing a plant or seedling when the roots are balled into a burlap container, not shown. The straps or wire-like devices, not shown, may fasten the earth ball to the base 17 utilizing if desired holes 19. Base 17 may be fabricated from wood or a multi-cellular rigid plastic material. A conventional clay pot 20 is illustrated resting on base 17 and is locked securely to the hot cap by its edges 21 which contact the inner surface. The base 17 may have a smaller diameter than illustrated to accommodate pots that have a small uppermost diameter. The smaller base would be forced up into the hot cap enclosure until a point is reached that the uppermost circumferential edge 21 of the pot securely engages the interior walls. The remaining free lowermost surfaces extending below the base 17 may either be removed or retained.

One of the advantages is an inexpensive prefabricated effective plant enclosure.

A further advantage is a plant enclosure which can be simply placed into the ground in secure engagement thereto.

Another advantage is a hot cap which has a generally pointed uppermost surface preventing the accumulation of snow or rain.

Still another advantage is a hot cap which may be shipped and stored in a flat position eliminating nesting problems and bulk increased shipping costs.

A further advantage is a structural design for a hot cap which facilitates the use of a wide variety of materials accommodating various conditions of climate and thereby varied functional methods of protecting the plants within.

Another advantage is a hot cap which may be easily assembled in the field.

Still another advantage is a method where varied amounts of air may be circulated through the enclosure upon simple manipulation of its elements and the earth adjacent the surface of the hot cap.

A further advantage is a hot cap which can be utilized in conjunction with a circular base as a shipping or storage container for plants, seedlings, and the like.

Thus, there is disclosed in the above description and in the drawings, embodiments of the invention which fully and effectively accomplish the objects thereof. However, it will be apparent, to those skilled in the art, how to make variations and modifications to the instant invention. Therefore, this invention is to be limited not by the specific disclosure herein, but only by the appending claims.

The embodiments of the invention in which an exclusive privilege or property is claimed are defined as follows:

I claim:

1. A hot cap comprising two layers of semi-rigid material in juxtaposed position, each of said layers having edges in a generally trapezoidal shape with a first continuous edge parallel to a second edge having a length shorter than the length of said first continuous edge, a third edge joining one free end of said first continuous edge to one free end of said second edge, a fourth edge joining the other free end of said first continuous edge to the other free end of said second edge, a rectangular knotch interruptingly severing a portion of said second edge intermediate and midway the ends thereof, two side edges of said rectangular knotch perpendicular to said first continuous edge, said two side edges having a length greater than the length of said interrupted portion in said second edge, said interrupted portion in said second edge having a length equal to the length of the remaining edge of said rectangular knotch, a first line in the surface of each layer of said semi-rigid material alongst which said semi-rigid material is weakened extending to said third edge at one end thereof and to said fourth edge at the other end thereof, said first line parallel to said second edge and passing through said remaining edge of said rectangular knotch, a second line in the surface of each layer of said semi-rigid material alongst which said semi-rigid material is weakened, said second line having one end terminating midway along the length of said remaining edge of said rectangular knotch, said second line perpendicular to said second edge and said remaining edge of said rectangular knotch, the other end of said second line intermediate said first line and said first continuous edge, means to join a portion of the interstitial surfaces adjacent said third edges of each of said layers together, means to join a portion of the interstitial surfaces adjacent said fourth edges of each of said layers together, said joined portion of said third edges extending from one end of said first continuous edge to the first end of said first line, said first end of said first line terminating at said third edges, said joined portion of said fourth edges extending from the other end of said first continuous edge to the second end of said first line, said second end of said first line terminating at said fourth edges, a plurality of holes piercing through each layer of said semi-rigid material wherein each hole is centered along a third line parallel to said first continuous edge, said third line intermediate said first continuous edge and said first line, four holes piercing coaxially through each of said layers of said semi-rigid material wherein each of said four holes are centered on a fourth line, said fourth line parallel to and intermediate said second edge and said first line, two of said four holes lying intermediate said third edge and a fifth line coextensive with said second line extending through said interrupted portion of said second edge, second two of said four holes lying intermediate said fourth edge and said fifth line.

2. The hot cap of claim 1 wherein transparent plastic is utilized as said semi-rigid material.

3. The hot cap of claim 1 wherein translucent plastic is utilized as said semi-rigid material.

4. The hot cap of claim 1 wherein opaque plastic is utilized as said semi-rigid material.

5. The hot cap of claim 1 wherein a waterproof paper-like sheet is utilized as said semi-rigid material.

6. The hot cap of claim 1 further comprising a base member secured to the lower portion thereof and said base member being comprised of a rigid material having a circumferential edge perpendicular to the uppermost and lowermost lateral surfaces thereof, a plurality of holes whose axes are vertical to said uppermost lateral surface and pierce said uppermost and lowermost lateral surfaces.

7. The rigid material of claim 6 wherein said rigid material is fabricated from wood.

8. The rigid material of claim 6 wherein said rigid material is fabricated from plastic having a plurality of voids therein confined between said uppermost and lowermost surfaces.

* * * * *